UNITED STATES PATENT OFFICE 2,644,820

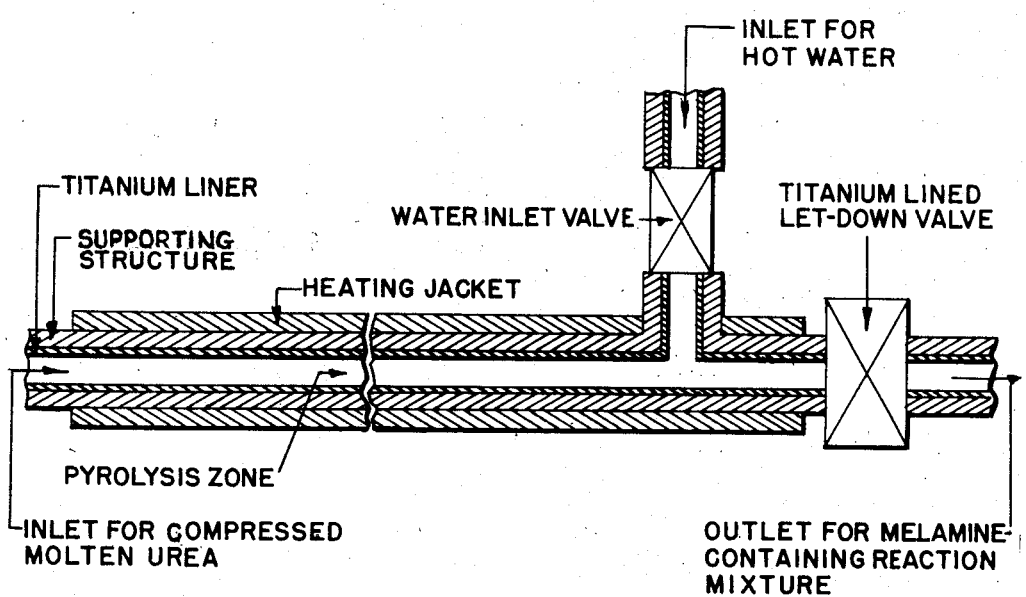

APPARATUS AND METHOD FOR PREPARING MELAMINE

William F. Gresham, Wilmington, Del., assignor to E. I. du Pont de Nemours and Company, Wilmington, Del., a corporation of Delaware Application January 5, 1950, Serial No. 136,943

8 Claims. (Cl. 260—249.7)

This invention relates to apparatus for carrying out chemical reactions. More particularly it relates to apparatus suitable for carrying out corrosive chemical reactions of the type involving the use of elevated temperatures and pressures, and to processes wherein such apparatus is employed.

The problem of providing apparatus suitable for carrying out high temperature, high pressure reactions on an efficient scale is a very serious one. At the very outset, the fact that the reaction must take place at high pressures eliminates many possible designs and many possible materials of construction. Secondly, many designs and materials of construction which could withstand these pressures at low temperatures are rendered useless by the general weakening effect of high temperatures. Thirdly, the effect of elevated temperatures, particularly in combination with elevated pressures, is to increase tremendously the corrosiveness of chemicals. And, finally, in large-scale installations involving thorough agitation or high rates of throughput of the reactants, erosion becomes a critical factor.

In attempting to carry out the synthesis of melamine by pyrolysis of urea, this problem of providing suitable apparatus is presented in a particularly acute form. The process is usually carried out at temperatures of about 275° C. to 550° C. under pressures generally in excess of 200 atmospheres, preferably under pressures of about 400 to 1000 atmospheres. At these elevated temperatures and pressures, the reaction mixture is so corrosive, and the erosion problems presented in large-scale installations are so severe, that no entirely satisfactory apparatus for carrying out this process has heretofore been available. Designs and materials of construction previously used have either been unable to withstand the pressure, the temperature or the corrosiveness, or the combination of these factors, or else they have been so costly as to be unattractive from a commercial viewpoint. In short, the high temperatures involved in the pyrolysis of urea to melamine present a new kind of problem insofar as the provision of adequate apparatus is concerned.

It is an object of this invention to provide apparatus for carrying out the synthesis of melamine by pyrolysis of urea at elevated temperatures and pressures. Another object is to provide apparatus which will permit the pyrolysis of urea to melamine to be carried out without frequent replacement of the reaction vessel, so that the process can be operated for sufficiently long periods of time to make the manufacture of melamine by pyrolysis of urea commercially feasible. A further object is to provide improved processes for synthesizing melamine employing such apparatus. Other objects of the invention will appear hereinafter.

These objects are accomplished by an apparatus for use in the synthesis of melamine from urea which comprises a reaction vessel having an inner surface consisting of titanium, said inner surface being in contact with products contained within said reaction vessel and said products resulting from the pyrolysis of urea at a temperature of 275° C. to 550° C. under a pressure in excess of 200 atmospheres.

The ability of the apparatus of this invention to withstand these rigorous conditions is very surprising in view of the serious defects of the various kinds of apparatus previously tested in this connection. Because of the pressure and temperature limitations, designs which involve the use of materials other than metals are for the most part impractical. Of the noble metals, almost all of them are ruled out, as far as commercial operations are concerned, by their extremely high cost. Silver, which of all the noble metals comes closest to being useful on a cost basis, is too soft to be able to withstand the high pressures at high temperatures, with the result that even when it is used as a liner, the apparatus develops leaks by extrusion of the liner flanges within a few hours. Iron, one of the metals most commonly employed in fabricating chemical apparatus, is wholly unsuited. Of the other base metals, even those which are generally considered to be highly resistant to corrosion all fail rapidly. For instance, stainless steels, nickel, alloys such as Monel metal, Inconel, Hastelloy A and Everdur, all corrode very rapidly and are obviously brown, dirty, severely discolored and pitted after only a few hours exposure to the reaction conditions.

In sharp contrast thereto, after exposure of titanium to these rigorous reaction conditions for a three-hour interval, for instance, the initial brightness of the metal is hardly altered. Whereas the corrosion rate for other base metals would ordinarily be calculated in terms of hours, the corrosion rate for titanium under these conditions is calculated in terms of years. Tests indicate that the corrosion rate is of the order of 0.0352 inch per year. It thus appears that titanium is uniquely superior to other base metals in this respect.

In the pyrolysis of urea to melamine, the greatest amount of corrosion apparently occurs in the initial stages of the reaction. For this reason, it is most important than an inner surface consisting of titanium be provided at the particular portion of the reaction vessel at which said initial stages of the reaction take place. For example, if the reaction were to be carried out in a tubular reactor, it would be most important to provide an inner surface consisting of titanium near the inlet to the reactor. Preferably the entire inner surface of the reaction vessel consists of titanium, since the reaction mixture is extremely corrosive even after the initial stages of the reaction have occurred.

According to a preferred embodiment of the invention, the reaction vessel is fitted with a let-down valve which is lined with titanium. This valve may be heated from an external source in order to facilitate removal of the melamine.

According to another preferred embodiment of the invention, the reaction vessel is provided with a high pressure water injection device, located close to the reactor outlet and adapted for the injection of water to quench the reactants, thereby permitting removal of the melamine in the form of an aqueous solution.

The term "titanium" is used herein to mean relatively pure titanium metal, which may contain up to a few percent of impurities or suitable alloying metals.

The reaction vessel having an inner surface consisting of titanium may be designed either for a batch or a continuous process. Because of the great strength, hardness and toughness of titanium and its ability to withstand the high pressures involved, the entire reaction vessel may be constructed of titanium. Titanium castings can be employed or suitable titanium parts can be welded together to form the reaction vessel. Preferably the titanium is used in the form of a liner, supported by any material of construction strong enough to withstand the pressures. Titanium-lined equipment of this type can be produced by plating processes, by employing prefabricated liners or tubing, or by other known methods. Alternately the titanium may be used in the form of a cylindrical cartridge, suspended between the reaction mixture and a suitable pressurized backing medium such as water, the water in turn being contained by any material of construction strong enough to withstand the pressures.

If desired, titanium may also be used advantageously to minimize corrosion on the inner surfaces of the equipment in which the reaction mixture is processed for separation of the melamine.

The apparatus should be designed in such a way as to minimize erosion problems by avoiding all unnecessary changes in the direction of flow of the reactants. For this reason, the preferred apparatus, as illustrated by the accompanying drawing, comprises a tubular reaction vessel lined throughout with titanium, said reaction vessel being fitted with a device for injecting urea at the inlet thereof and a water injection device located near the outlet thereof, and equipped with a titanium-lined let-down valve which is heated from an external source. The tubular converter may be jacketed with molten lead or heated by a heat transfer salt circulated through a jacket.

It is to be understood that the reaction vessel employed in the apparatus of this invention need not necessarily be tubular, but that any other suitable form of pyrolysis vessel may be employed, including coils, U-tubes, vertical towers, autoclaves, and the like.

Temperatures of about 275° C. to 550° C. and pressures in excess of 200 atmospheres are usually employed when pyrolyzing urea in the apparatus of this invention, although super-atmospheric pressures in general and temperatures below 275° C. may also be useful. It has been observed that, under the preferred conditions, i. e. at temperatures of about 385° C. to 550° C. and pressures of about 400 to 1000 atmospheres, urea is converted to melamine in virtually quantitative yields even at very short reaction times of the order of 3.5 minutes or less. The reaction may be carried out in the presence of ammonia from an external source, i. e. ammonia in excess of that resulting from the conversion of urea to melamine. Preferably small amounts of ammonia from an external source are employed.

The melamine may be removed from the reaction vessel as a vapor or as a solution in a solvent such as water, or as a suspension.

Melamine may also be prepared advantageously from other nitrogen-containing compounds such as dicyandiamide, biuret, melem, melam, mellon, ammelide, ammeline and cyanuric acid, using the principles of this invention.

Since many different embodiments of the apparatus and process of this invention may be made by those skilled in the art without departing from the spirit and scope thereof, it is to be understood that the invention is not limited in any way except as set forth in the following claims.

I claim:

1. A process for minimizing corrosion difficulties in the preparation of melamine from urea which comprises pyrolyzing urea at a temperature within the range of from 275° C. to 550° C. and under a pressure in excess of 200 atmospheres in a reaction vessel having an inner surface consisting of titanium and thereafter separating melamine from the reaction mixture.

2. A process for minimizing corrosion difficulties in the preparation of melamine from urea which comprises injecting urea together with ammonia from an external source into a tubular converter lined throughout with titanium, subjecting the urea and ammonia in said converter to a temperature of about 385° C. to 550° C. at a pressure of about 400 to 1000 atmospheres, injecting water into the reaction mixture as it approaches the outlet of the converter, removing the resulting aqueous solution from the converter through a titanium-lined let-down valve, and thereafter separating melamine from said aqueous solution.

3. A process for minimizing corrosion difficulties in the preparation of melamine from urea which comprises pyrolyzing urea at a temperature within the range of from 275° C. to 550° C. and under a pressure in excess of 200 atmospheres in a reaction vessel having an inner surface consisting of titanium, removing the reaction mixture from the reaction vessel through a titanium-lined let-down valve which is heated from an external source, and thereafter separating melamine from the reaction mixture.

4. A process for minimizing corrosion difficulties in the preparation of melamine from urea which comprises pyrolyzing urea at a temperature within the range of from 275° C. to 550° C. and under a pressure in excess of 200 atmospheres in a tubular reaction vessel having an inner surface consisting of titanium, injecting water into the reaction mixture as it approaches the outlet of the tubular reaction vessel, and thereafter separating melamine from the reaction mixture.

5. A process for minimizing corrosion difficulties in the preparation of melamine from urea which comprises pyrolyzing urea at a temperature within the range of from 385° C. to 550° C. and a pressure of about 400 to 1000 atmospheres in a reaction vessel having an inner surface consisting of titanium, and thereafter separating melamine from the reaction mixture.

6. A process for minimizing corrosion difficulties in the preparation of melamine from urea which comprises pyrolyzing urea at a temperature within the range of from 275° C. to 550° C. and under a pressure in excess of 200 atmospheres in a reaction vessel having an inner surface consisting of titanium and in the presence of ammonia from an external source, and thereafter separating melamine from the reaction mixture.

7. A process for minimizing corrosion difficulties in the preparation of melamine from urea which comprises pyrolyzing urea at a temperature within the range of from 275° C. to 550° C. and under a pressure in excess of 200 atmospheres in a reaction vessel, the entire inner surface of which consists of titanium, and thereafter separating melamine from the reaction mixture.

8. In the process of making melamine that comprises heating a melamine forming substance above 275° C. and under superatmospheric pressure whereby melamine is formed, the improvement that comprises conducting said melamine formation in a closed reaction vessel whose inner surface is titanium.

WILLIAM F. GRESHAM.

References Cited in the file of this patent

UNITED STATES PATENTS

| Number | Name | Date |
|---|---|---|
| 2,205,854 | Kroll | June 25, 1940 |

FOREIGN PATENTS

| Number | Country | Date |
|---|---|---|
| 354,965 | Great Britain | Aug. 20, 1931 |
| 583,504 | Great Britain | Dec. 19, 1946 |
| 598,175 | Great Britain | Feb. 12, 1948 |
| 933,241 | France | Dec. 17, 1947 |

OTHER REFERENCES

Barksdale, "Titanium," pp. 52 and 53, 1949, The Ronald Press Co.

Fontana, article in "Ind. and Eng. Chem.," pp. 99A and 100A, Oct. 1948.

Fontana, article in "Ind. and Eng. Chem." pp. 103A and 104A, Feb. 1949.

Kroll, article in "Trans. Elec. Chem. Soc." pp. 35–47, vol. 28, 1940 pages 45–46 pertinent.

Uhlig, "Corrosion Handbook, p. 329, 1948 John Wiley and Sons, Inc. N. Y.